(12) United States Patent
Imamoto

(10) Patent No.: US 11,252,057 B2
(45) Date of Patent: Feb. 15, 2022

(54) INFORMATION PROCESSING APPARATUS, INFORMATION PROCESSING SYSTEM, INFORMATION PROCESSING METHOD, AND COMPUTER PROGRAM

(71) Applicant: PANASONIC INTELLECTUAL PROPERTY MANAGEMENT CO., LTD., Osaka (JP)

(72) Inventor: Yoshiharu Imamoto, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 9 days.

(21) Appl. No.: 16/814,657

(22) Filed: Mar. 10, 2020

(65) Prior Publication Data

US 2020/0296015 A1 Sep. 17, 2020

(30) Foreign Application Priority Data

Mar. 14, 2019 (JP) .............................. JP2019-046889

(51) Int. Cl.
| | |
|---|---|
| G06F 12/14 | (2006.01) |
| H04L 29/06 | (2006.01) |
| H04L 12/26 | (2006.01) |
| H04L 29/08 | (2006.01) |

(52) U.S. Cl.
CPC ............ *H04L 43/04* (2013.01); *H04L 43/026* (2013.01); *H04L 43/08* (2013.01); *H04L 63/1425* (2013.01); *H04L 67/327* (2013.01)

(58) Field of Classification Search
USPC ........ 370/352; 709/229, 225, 226, 238, 232, 709/246; 715/243, 246, 253, 273
See application file for complete search history.

(56) References Cited

U.S. PATENT DOCUMENTS

| | | | |
|---|---|---|---|
| 7,934,154 B2 * | 4/2011 | Kobashi ................ | G06F 40/106 |
| | | | 715/243 |
| 9,794,286 B2 | 10/2017 | Otsuka et al. | |
| 2007/0192863 A1 * | 8/2007 | Kapoor ................... | H04L 67/10 |
| | | | 726/23 |
| 2008/0229415 A1 * | 9/2008 | Kapoor ................... | H04L 63/14 |
| | | | 726/22 |

(Continued)

FOREIGN PATENT DOCUMENTS

JP 2014-146868 8/2014

*Primary Examiner* — Jude Jean Gilles
(74) *Attorney, Agent, or Firm* — Greenblum & Bernstein, P.L.C.

(57) ABSTRACT

An analysis ECU acquires information related to a first flow and information related to a second flow, the first flow and the second flow organizing packets transferred in a monitored system into respective groups. The analysis ECU acquires information related to a conversion that takes the first flow as input and the second flow as output. The analysis ECU acknowledges alert information generated in the monitored system and including information capable of identifying at least one flow. The analysis ECU generates, when the second flow is identified by the alert information, route information that includes at least one of the information related to the conversion and the information related to the first flow associated with the second flow in the information related to the conversion.

8 Claims, 7 Drawing Sheets

(56) References Cited

U.S. PATENT DOCUMENTS

| | | | | |
|---|---|---|---|---|
| 2008/0262991 | A1* | 10/2008 | Kapoor | H04L 63/14 |
| | | | | 706/20 |
| 2011/0214157 | A1* | 9/2011 | Korsunsky | H04L 63/1441 |
| | | | | 726/1 |
| 2011/0231510 | A1* | 9/2011 | Korsunsky | G06F 21/55 |
| | | | | 709/213 |
| 2011/0231564 | A1* | 9/2011 | Korsunsky | H04L 63/1483 |
| | | | | 709/231 |
| 2015/0323937 | A1* | 11/2015 | Murakami | B01L 7/52 |
| | | | | 436/55 |
| 2015/0358351 | A1 | 12/2015 | Otsuka et al. | |
| 2017/0048286 | A1* | 2/2017 | Ichihashi | H04N 7/15 |
| 2019/0102785 | A1* | 4/2019 | Yamaguchi | G06Q 30/02 |
| 2019/0361844 | A1* | 11/2019 | Mizuno | G06F 21/62 |

* cited by examiner

INFORMATION PROCESSING APPARATUS, INFORMATION PROCESSING SYSTEM, INFORMATION PROCESSING METHOD, AND COMPUTER PROGRAM

BACKGROUND OF THE INVENTION

1. Field of the Invention

The present disclosure relates to a data processing technology and, more particularly, to an information processing apparatus, an information processing system, an information processing method, and a computer program.

2. Description of the Related Art

A technology for sensing an abnormality of a network in accordance with a period of receiving CAN (Controller Area Network) frames is proposed (see, for example, patent literature 1).

[Patent literature 1] JP2014-146868

The technology disclosed in patent literature 1 is capable of sensing an attack from outside or an absence thereof but is not capable of identifying a route of attack. It may therefore be difficult to handle the situation.

SUMMARY OF THE INVENTION

The disclosure addresses the above-described issue, and a general purpose thereof is to support identification of a route leading to the occurrence of an abnormality in a monitored system.

The information processing apparatus according to an embodiment of the present disclosure includes: an acquisition unit that acquires information related to a first flow, information related to a second flow, and information related to a conversion that takes the first flow as input and the second flow as output, the first flow and the second flow organizing packets transferred in a monitored system into respective groups, an alert acknowledgment unit that acknowledges alert information generated in the monitored system and including information capable of identifying at least one flow; and a generation unit that generates, when the second flow is identified by the alert information, route information that includes at least one of the information related to the conversion and the information related to the first flow associated with the second flow in the information related to the conversion.

Another embodiment relates to an information processing method. The method is implemented by a computer and includes: acquiring information related to a first flow and information related to a second flow, the first flow and the second flow organizing packets transferred in a monitored system into respective groups, and information related to a conversion that takes the first flow as input and the second flow as output; acknowledging alert information generated in the monitored system and including information capable of identifying at least one flow; and generating, when the second flow is identified by the alert information, route information that includes at least one of the information related to the conversion and the information related to the first flow associated with the second flow in the information related to the conversion.

Optional combinations of the aforementioned constituting elements, and implementations of the present disclosure in the form of devices, systems, computer programs, recording mediums having computer programs recorded thereon, vehicles carrying information processing apparatuses or information processing systems may also be practiced as additional modes of the present disclosure.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

A description will first be given of "flow" in the embodiment. The flow in the embodiment complies with the flow defined in the IPFIX (Internet Protocol Flow Information Export) protocol. Specifically, the flow in the embodiment is a set of packets having a common source of transmission and a common destination of transmission in a communication traffic, i.e., a group of packets transferred in a monitored system.

Figure 1:
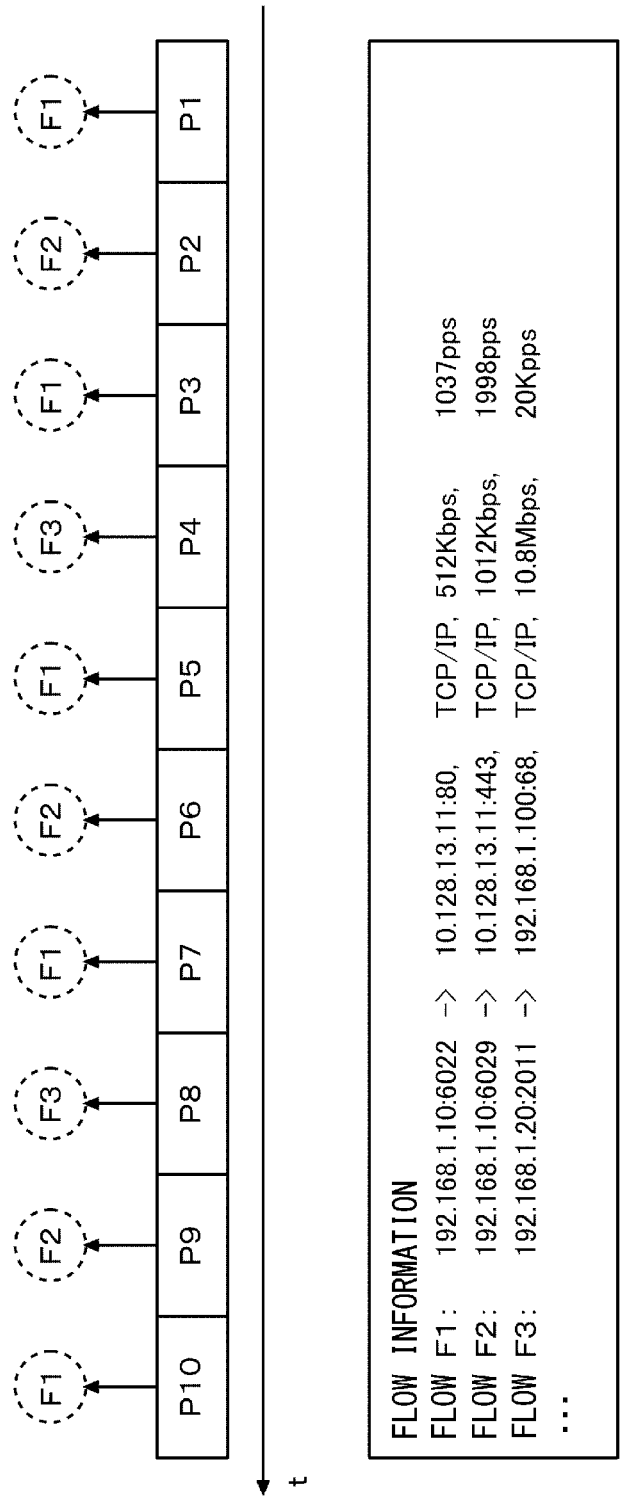
FIG. 1 shows an example of a flow.

FIG. 1 shows an example of a flow. The figure shows that ten packets denoted by P1-P10 have arrived in the stated order. Of these packets, P1, P3, P5, P7, and P10 belong to flow F1, and P2, P6, and P9 belong to flow F2, and P4 and P8 belong to flow F3.

Flow information in an IP network includes a source IP address, a source port number, a destination IP address, a destination port number, a protocol type, and a traffic volume. For example, flow F1 is a group of packets having a source IP address "192.168.1.10", a source port number "6022", a destination IP address "10.128.13.11", and a destination port number "80". The protocol type is, for example, TCP/IP, UDP/IP, ICMP, CAN, etc. The traffic volume includes a transfer speed bps (bit per second) and a packet processing speed pps (packets per second).

A general definition of a flow is not given in CAN. In the embodiment, a flow in a CAN is defined as information related to the source and destination identified by a CAN frame. More specifically, the combination of the source ECU and the CAN-ID identified by a CAN frame is defined as a flow in a CAN. The source ECU may be identified by a publicly known ECU fingerprint. In other words, the source ECU may be identified by referring to the signal waveform of a CAN frame. Meanwhile, the destination ECU may be identified by a signal table defining the correspondence between CAN-IDs and receiving ECUs. Alternatively, the source ECU may autonomously define data (signature, hash chain, etc.) capable of identifying the source ECU in the payload of a CAN frame, thereby making it possible to identify the source ECU by referring to the payload data in a CAN frame. The method of identifying a source by referring to a hash chain is publicly made known in JP2018-133744 and is not described here. In interprocess communication within an ECU, the source and destination are identified by a process ID and a program identifier, and a flow is defined accordingly.

Figure 2:
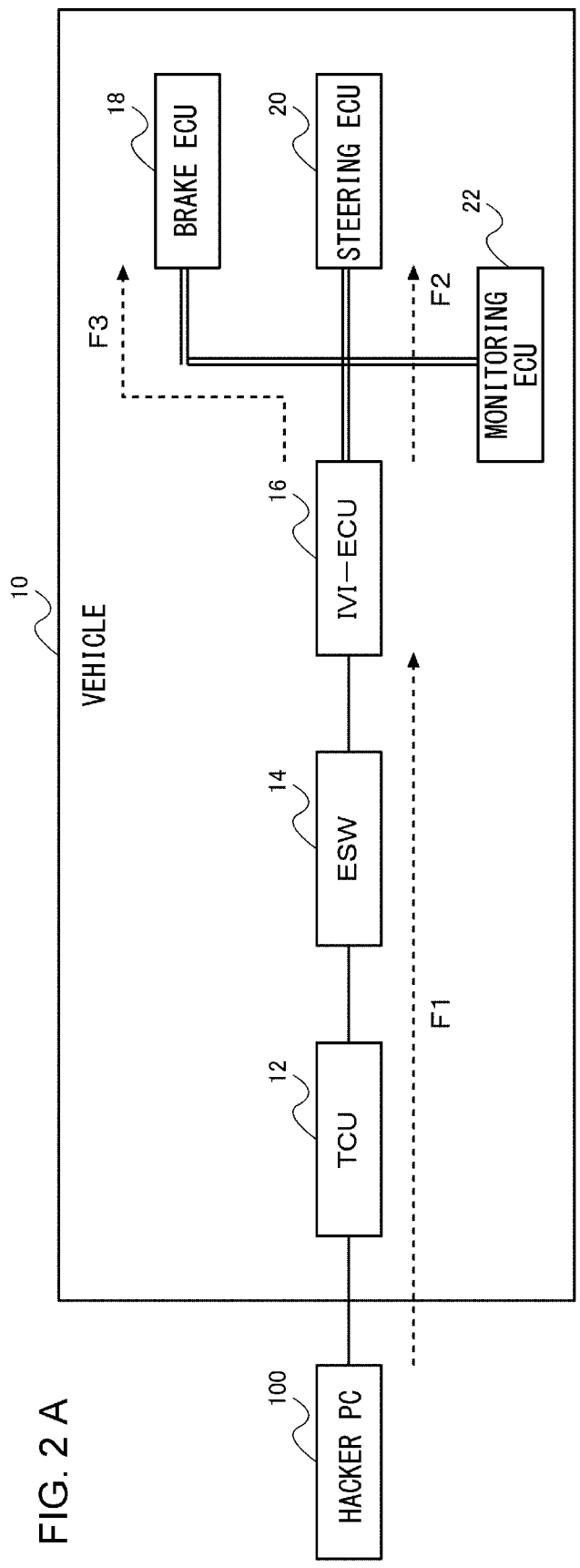
FIG. 2A is an exemplary configuration of a vehicle-mounted system.
FIG. 2B shows flow information in the vehicle-mounted system of FIG. 2A.
FIG. 2C shows conversion information in the vehicle-mounted system of FIG. 2A.

FIG. 2A is an exemplary configuration of a vehicle-mounted system. A vehicle 10 includes a TCU 12, an ESW 14, an IVI-ECU 16, a brake ECU 18, a steering ECU 20, and a monitoring ECU 22. The solid line connecting apparatuses indicates an IP network, and the double line connecting apparatuses indicates a CAN. The same holds true of the following drawings.

The TCU (Telematics Communication Unit) 12 is a communication apparatus that can connect to a cellular phone network (i.e., a communication carrier network). The ESW 14 is an Ethernet switch ("Ethernet" is a registered trademark). The IVI (in-vehicle Infotainment system)-ECU (Electronic Control Unit) 16 controls infotainment devices such as navigation, display, and audio apparatuses. The brake ECU 18 controls the operation of the braking apparatus of the vehicle 10. The steering ECU 20 controls the operation of the steering apparatus of the vehicle 10.

The monitoring ECU 22 senses an attack to the respective apparatuses of the vehicle-mounted system (e.g., the brake ECU 18, the steering ECU 20, etc.). The monitoring ECU 22 may sense an attack using a publicly known method. For example, the monitoring ECU 22 may sense an attack based on an abnormal period of CAN frames or identify the CAN-ID of the CAN frame used in the attack. When an attack is sensed, the monitoring ECU 22 outputs alert information indicating the detail of sensing. The monitoring ECU 22 may further sense an abnormality in the IP network using a publicly known method.

FIG. 2B shows flow information in the vehicle-mounted system of FIG. 2A. FIG. 2C shows conversion information in the vehicle-mounted system of FIG. 2A. Conversion information is information related to a conversion that receives an input of a first flow and outputs a second flow different from the first flow. Conversion P1 of FIG. 2C shows a conversion that receives an input of flow F1 outputs flow F2 and flow F3. Conversion information further includes the name of the program implementing the conversion process and the name (or the ID) of the apparatus executing the conversion process. Conversion P1 of FIG. 2C is shown such that a program name is "program α" and an entity of execution of the conversion process is "IVI-ECU 16".

FIG. 2A also shows a PC of a hacker (hacker PC 100) attacking the vehicle 10. In the case the hacker PC 100 attacks the steering ECU 20, the content of the packet transmitted from the hacker PC 100 (attack content) arrives at the steering ECU 20 via flow F1 and flow F2.

Figure 3:
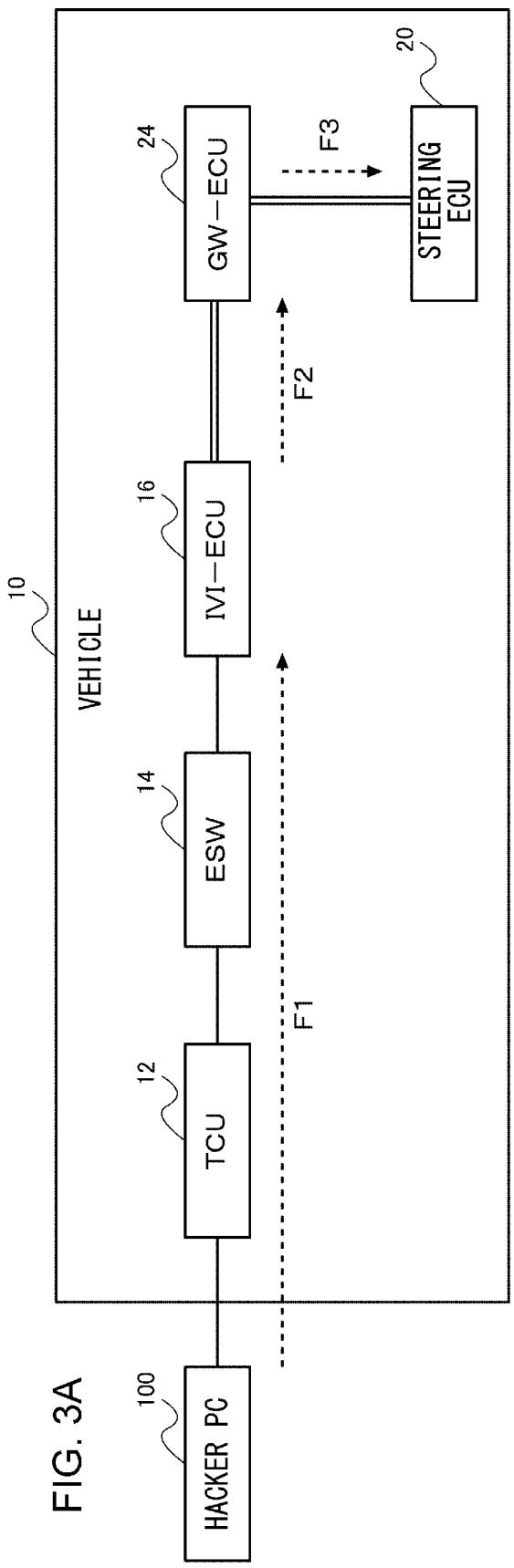
FIG. 3A shows an exemplary configuration of a vehicle-mounted system.
FIG. 3B shows flow information in the vehicle-mounted system of FIG. 3A.
FIG. 3C shows conversion information in the vehicle-mounted system of FIG. 3A.

FIG. 3A also shows an exemplary configuration of a vehicle-mounted system. The vehicle 10 includes the TCU 12, the ESW 14, the IVI-ECU 16, a GW-ECU 24, and the steering ECU 20. The GW (Gateway)-ECU 24 cancels a difference in the bus, flow, communication protocol, etc. and relays packets. The GW-ECU 24 relays CAN frames between different CAN buses. The GW-ECU 24 also includes the function of the monitoring ECU 22 of FIG. 2A.

FIG. 3B shows flow information in the vehicle-mounted system of FIG. 3A. FIG. 3C shows conversion information in the vehicle-mounted system of FIG. 3A. Like FIG. 2A, FIG. 3A also shows the hacker PC 100. In the case the hacker PC 100 attacks the steering ECU 20, the content of the packet transmitted from the hacker PC 100 (attack content) arrives at the steering ECU 20 via flow F1, flow F2, and flow F3.

Figure 4:
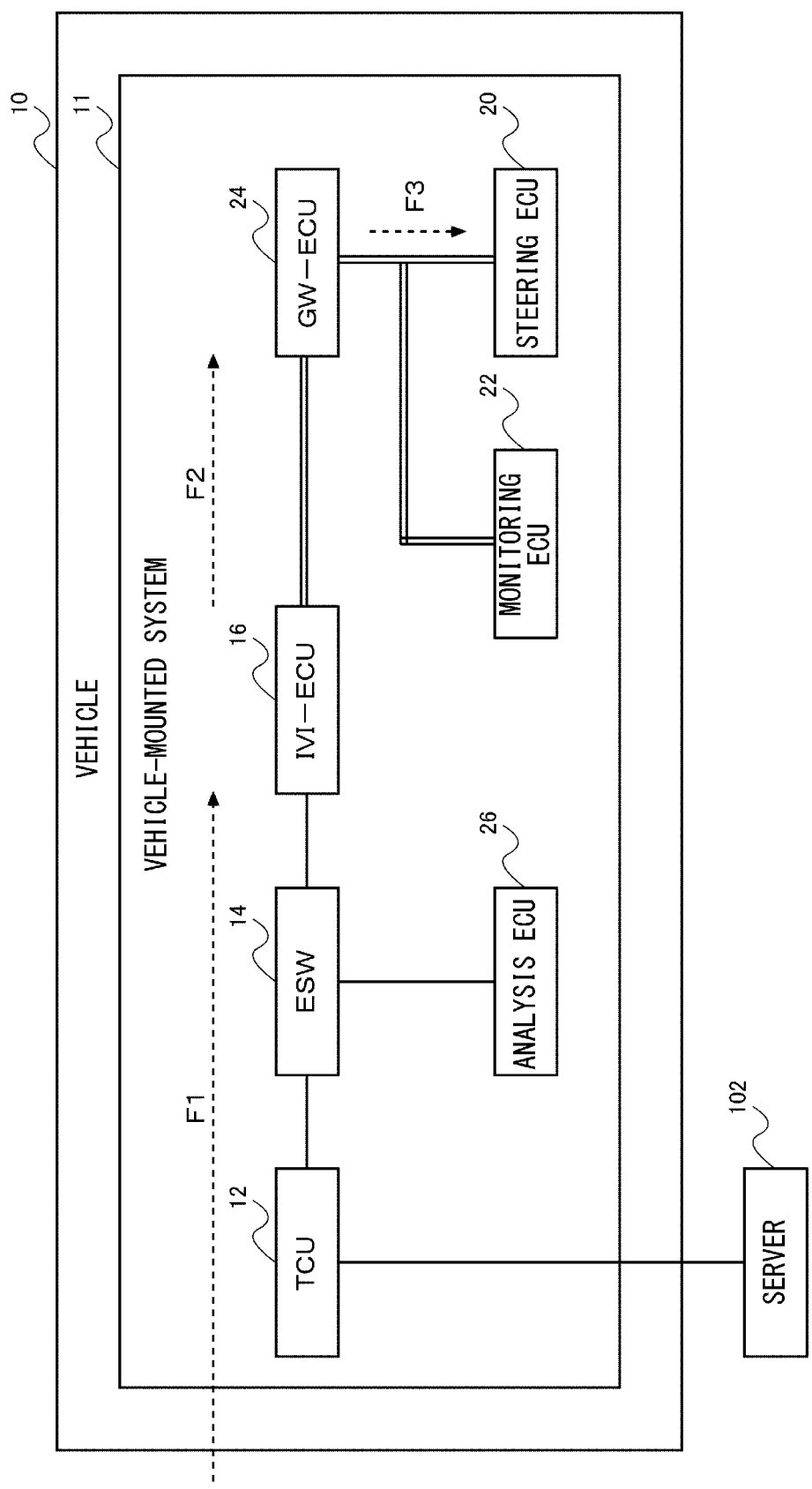
FIG. 4 shows a configuration of a vehicle-mounted system according to the embodiment.

FIG. 4 shows a configuration of a vehicle-mounted system 11 according to the embodiment. The vehicle-mounted system 11 is a monitored apparatus according to the embodiment and includes the TCU 12, the ESW 14, the IVI-ECU 16, the GW-ECU 24, the steering ECU 20, the monitoring ECU 22, and an analysis ECU 26. The TCU 12 is connected to a server 102 via a cellular communication network. The server 102 collects and saves logs of the apparatuses of the vehicle-mounted system 11. Collection and saving of the logs of the apparatuses of the vehicle-mounted system 11 by the server 102 is by way of example only, and a storage apparatus provided in the vehicle-mounted system 11 may collect and save the logs of the apparatuses. The embodiment is non-limiting as to where the logs are collected and saved.

The IVI-ECU 16 executes flow conversion from flow F1 to flow F2, and the GW-ECU 24 executes flow conversion from flow F2 to flow F3. Where the TCU 12 has an IP address conversion function (e.g., the NAT (Network Address translation) function), the TCU 12 also executes flow conversion.

Flow conversion includes (1) flow conversion by a process on a Linux (registered trademark) host and (2) flow conversion by a gateway apparatus. The flow conversion of (1) includes conversion between IP packets (address conversion, etc.), conversion between an IP packet and a CAN frame, and conversion of flow by interprocess communication. The flow conversion of (2) includes conversion between CAN frames (relay across different buses, etc.) and conversion between an IP packet and a CAN frame.

The monitoring ECU 22 senses an attack to the vehicle-mounted system 11 that is monitored. When an attack is sensed, the monitoring ECU 22 generates alert information and transmits the alert information to the analysis ECU 26. When the alert information is received from the monitoring ECU 22, the analysis ECU 26 analyzes an attack route based on the alert information.

Figure 5:
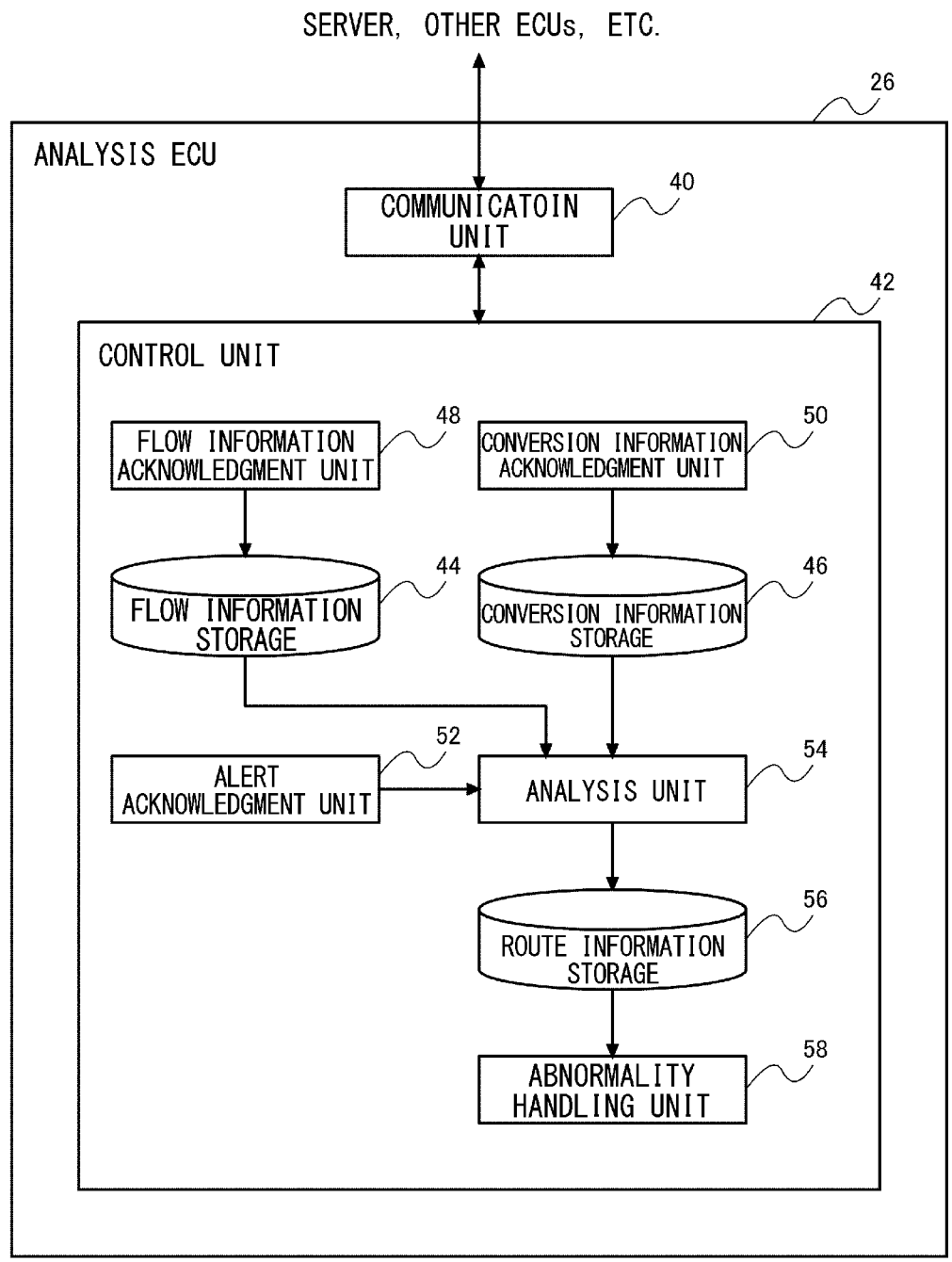
FIG. 5 is a block diagram showing the functional blocks of the analysis ECU of FIG. 4.

FIG. 5 is a block diagram showing the functional blocks of the analysis ECU 26 of FIG. 4. The blocks depicted in the block diagram of this disclosure are implemented in hardware by an element or a mechanical device such as a CPU and a memory of a computer and in software by a computer program, etc. The diagram depicts functional blocks implemented by the cooperation of these elements. It will be understood by those skilled in the art that these functional blocks may be implemented in a variety of manners by a combination of hardware and software.

The analysis ECU 26 includes a communication unit 40 and a control unit 42. The communication unit 40 communicates with an external apparatus (the server 102, other ECUs, etc.) in accordance with a predetermined communication protocol. The control unit 42 executes various data processes related to analysis of an attack route. The control unit 42 transmits and receives data to and from the external apparatus via the communication unit 40.

The control unit 42 includes a flow information storage 44, a conversion information storage 46, a flow information acknowledgment unit 48, a conversion information acknowledgment unit 50, an alert acknowledgment unit 52, an analysis unit 54, a route information storage 56, and an abnormality handling unit 58. A computer program including a plurality of modules corresponding to the plurality of these functional blocks may be stored in a ROM of the analysis ECU 26. The CPU of the analysis ECU 26 may exhibit the functions of the plurality of functional blocks above by reading the computer program into a RAM and running the program.

The flow information storage 44 stores a plurality of pieces of flow information collected from the respective apparatuses of the vehicle-mounted system 11 and related to the plurality of flows. Flow F1, flow F2, and flow F3 in the vehicle-mounted system 11 correspond to flow F1, flow F2, and flow F3 shown in FIG. 3. The flow information storage 44 stores the information on flow F1, the information on flow F2, and the information on flow F3 shown in FIG. 3.

The conversion information storage 46 stores the conversion information collected from the respective apparatuses of the vehicle-mounted system and related to one or more flow conversions. The IVI-ECU 16 in the vehicle-mounted system 11 executes conversion P1 shown in FIG. 3, and the GW-ECU 24 executes conversion P2 shown in FIG. 3. The conversion information storage 46 stores the information on conversion P1 and the information on conversion P2 shown in FIG. 3.

Each of the plurality of apparatuses (ECUs, etc.) of the vehicle-mounted system 11 transmits flow information and conversion information related to a packet process in the respective apparatus to the analysis ECU 26. In the embodiment, the TCU 12 transmits the information on flow F1 as output flow information to the analysis ECU 26. The IVI-ECU 16 transmits the information on flow F1 as input flow information to the analysis ECU 26 and transmits information on flow F2 as output flow information to the analysis ECU 26. Further, the IVI-ECU 16 transmits the information on conversion P1 to the analysis ECU 26.

The GW-ECU 24 transmits the information on flow F2 as input flow information to the analysis ECU 26 and transmits the information on flow F3 as output flow information to the analysis ECU 26. Further, the GW-ECU 24 transmits the information on conversion P2 to the analysis ECU 26. The steering ECU 20 transmits the information on flow F3 as input flow information to the analysis ECU 26.

The flow information acknowledgment unit 48 acknowledges the flow information transmitted from the respective apparatuses of the vehicle-mounted system 11 and stores the flow information in the flow information storage 44. Further, the conversion information acknowledgment unit 50 acknowledges the conversion information transmitted from the respective apparatuses of the vehicle-mounted system 11 and stores the conversion information in the conversion information storage 46.

In one variation, the flow information acknowledgment unit 48 and the conversion information acknowledgment unit 50 may autonomously acquire the flow information and the conversion information from the respective apparatuses of the vehicle-mounted system 11. In another variation the respective apparatuses of the vehicle-mounted system 11 may transmit information indicating a track record of processing packets (e.g., log data) to the analysis ECU 26. The analysis ECU 26 may generate flow information and conversion information based on the input packets, output packets, and pre-conversion and post-conversion packets indicated by the log data transmitted from the respective apparatuses and store the flow information and the conversion information in the flow information storage 44 and the conversion information storage 46. Alternatively, the flow information storage 44 and the conversion information storage 46 may be configured as a part of the analysis ECU 26 or implemented by storage apparatuses outside the analysis ECU. In other words, the analysis ECU 26 may acquire flow information and conversion information from the flow information storage 44 and the conversion information storage 46 provided inside or may acquire flow information and conversion information from the flow information storage 44 and the conversion information storage 46 provided outside.

The alert acknowledgment unit 52 acknowledges alert information transmitted from the monitoring ECU 22. The alert information includes information capable of identifying one flow. According to the embodiment, the information capable of identifying one flow is information indicating a destination of a packet and is exemplified by a combination of a destination IP address and a destination port number or a CAN-ID.

The analysis unit 54 includes the function of a generator that generates attack route information indicating a route of attack to the vehicle-mounted system 11. Specifically, when the first flow is identified by the alert information, the analysis unit 54 generates attack route information that includes at least one of i) conversion information indicating flow conversion involving the first flow and ii) information related to the second flow associated with the first flow in that conversion information. According to the embodiment, the analysis unit 54 generates attack route information that could include a plurality of flows and one or more conversions by starting with the flow indicated by the alert information and tracking the flow associated with that flow in the conversion information.

The analysis unit 54 stores data for the attack route information thus generated in the route information storage 56. The abnormality handling unit 58 executes a process to handle the abnormality in accordance with the attack route information stored in the route information storage 56. Specific examples of attack route information and abnormality handling processes will be described later.

Figure 6:
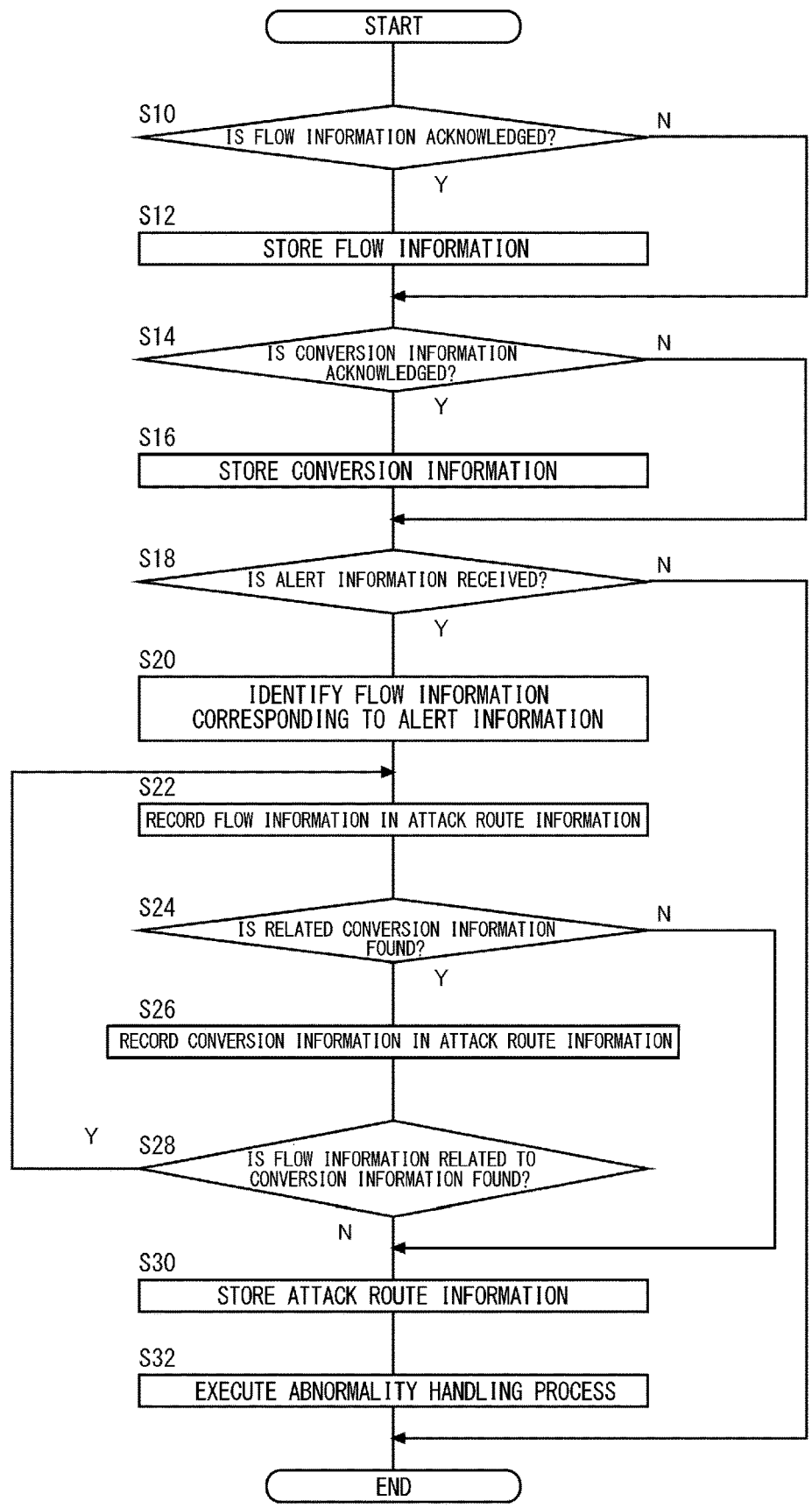
FIG. 6 is a flowchart showing the operation of the analysis ECU.

A description will be given of the operation of the analysis ECU 26 having the configuration described above. FIG. 6 is a flowchart showing the operation of the analysis ECU 26. When the flow information transmitted from the respective apparatuses of the vehicle-mounted system 11 is received (Y in S10), the flow information acknowledgment unit 48 stores the flow information in the flow information storage 44 (S12). When the flow information has not been received (N in S10), the process in S12 is skipped. When the conversion information transmitted from the respective apparatuses of the vehicle-mounted system 11 is received, the conversion information acknowledgment unit 50 stores the conversion information in the conversion information storage 46 (S16). When the conversion information has not been received (N in S14), the process in S16 is skipped.

When the alert acknowledgment unit 52 receives the alert information transmitted from the monitoring ECU 22 (Y in S18), the analysis unit 54 refers to the flow information stored in the flow information storage 44 and identifies the flow information (referred to as "flow information A") corresponding to the alert information (S20). The analysis unit 54 records flow information A in the attack route information (S22). The analysis unit 54 searches the conversion information stored in the conversion information storage 46 for the conversion information (referred to as "conversion information B") related to flow information A When conversion information B is found (Y in S24), the analysis unit 54 records conversion information B in the attack route information (S26).

The analysis unit 54 searches the flow information stored in the flow information storage 44 for the flow information (referred to as "flow information C") related to conversion information B. When flow information C is found (Y in S28), control is returned to S22, whereupon the analysis unit 54 records flow information C in the attack route information. When flow information C is not found (N in S28), or when conversion information B is not found (N in S24), i.e., when the flow information or the conversion information at the terminal end in the vehicle-mounted system 11 is reached, the analysis unit 54 terminates the process of generating attack route information. The analysis unit 54 stores the generated attack route information in the route information storage 56 (S30).

The abnormality handling unit 58 executes an abnormality handling process based on the attack route information stored in the route information storage 56 (S32). When the alert information has not been received (N in S18), the subsequent processes are skipped, and the illustrated flow is terminated. While the vehicle-mounted system 11 is in operation, the analysis ECU 26 repeatedly executes the process shown in FIG. 6. According to the analysis ECU 26 of the embodiment, it is possible to identify a route related to the occurrence of an abnormality in the monitored system, and the abnormality or the attack can be handled properly, or proper handling can be assisted, in accordance with the route.

Figure 7:
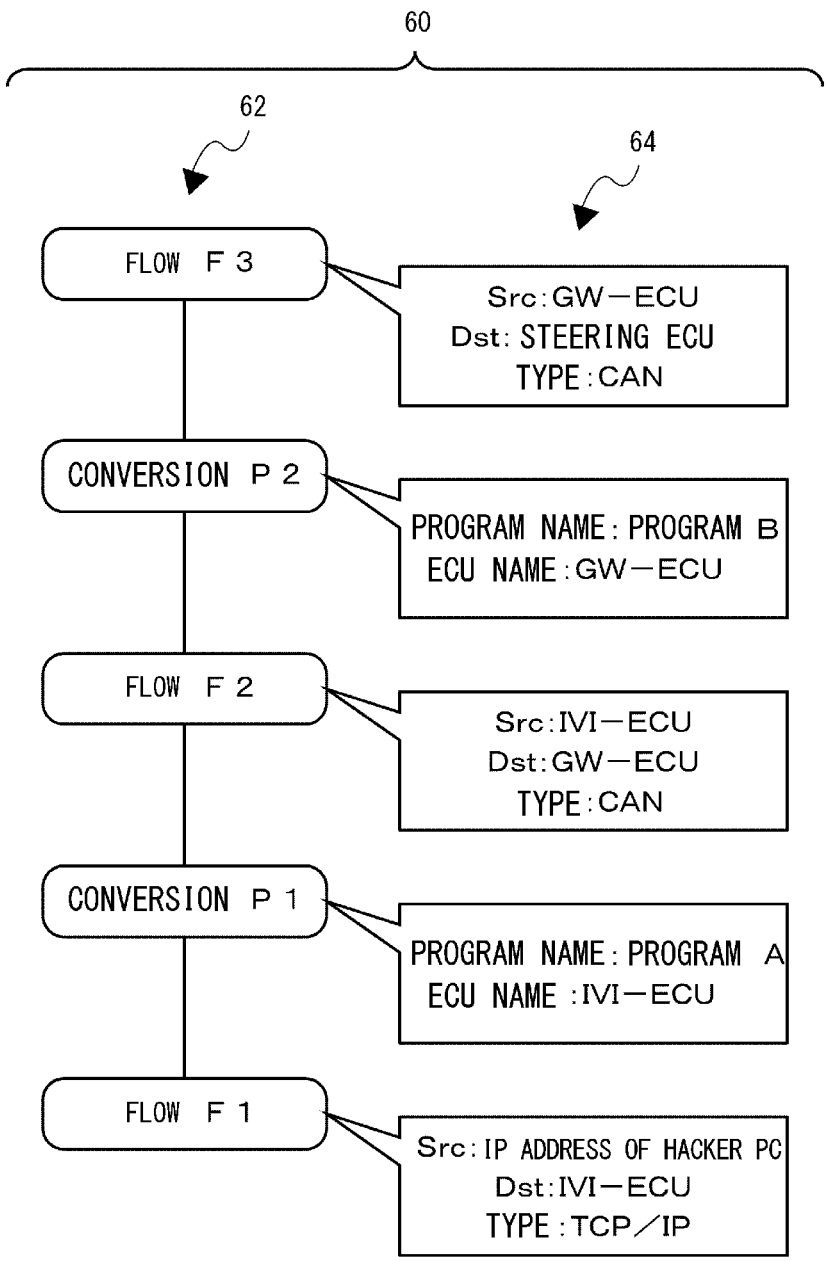
FIG. 7 shows an example of attack route information.

FIG. 7 shows an example of attack route information. Attack route information 60 includes a route graph 62 and attribute information 64. The route graph 62 includes flow names and conversion names as elements. The attribute information 64 is information associated with each element of the route graph 62 and indicates the attribute related to each element. The attribute information 64 according to the embodiment includes items of the flow information or items of the conversion information. The attribute information 64 further includes information indicating one or more apparatuses related to the transfer of the packet causing the generation of the alert information.

The attack route information 60 of FIG. 7 is attack route information generated when the monitoring ECU 22 senses an attack CAN frame (CAN-ID is 0x100), and the analysis ECU 26 acknowledges alert information indicating the sensing. The analysis unit 54 of the analysis ECU 26 refers to the flow information storage 44 and identifies flow F3 associated with the CAN-ID "0x100". The analysis unit 54 records flow F3 as the first element of the route graph 62 and records the information on flow F3 in the attribute information 64.

The analysis unit 54 then searches the conversion information storage 46 for a conversion that outputs flow F3 and acquires the information on conversion P2. The analysis unit 54 records conversion P2 as the second element of the route graph 62 and records the information on conversion P2 in the attribute information 64. The analysis unit 54 then searches the flow information storage 44 for flow F2 that is an input to conversion P2 and acquires the information on flow F2. The analysis unit 54 records flow F2 as the third element of the route graph 62 and records the information on flow F2 in the attribute information 64.

The analysis unit 54 then searches the conversion information storage 46 for a conversion that outputs flow F2 and acquires the information on conversion P1. The analysis unit 54 records conversion P1 as the fourth element of the route graph 62 and records the information on conversion P1 in the attribute information 64. The analysis unit 54 then searches the flow information storage 44 for flow F1 that is an input to conversion P1 and acquires the information on flow F1. The analysis unit 54 records flow F1 as the fifth element of the route graph 62 and records the information on flow F1 in the attribute information 64. Since there are no conversions that output flow F1, the analysis unit 54 terminates the search for flow information and conversion information and stores the attack route information 60 shown in FIG. 7 in the route information storage 56.

An example of an abnormality handling process performed by the abnormality handling unit 58 will be described. When the attack route information is stored in the route information storage 56, i.e., when the attack route information is generated by the analysis unit 54, the abnormality handling unit 58 may execute one of abnormality handling processes from (1) to (4) listed below or a combination thereof.

(1) The abnormality handling unit 58 may transmit the alert information acknowledged by the alert acknowledgment unit 52 and the attack route information stored in the route information storage 56 to a predetermined external apparatus (e.g., the server 102). Further, the abnormality handling unit 58 may notify the server 102 of a device on the attack route indicated by the attack route information as a vulnerable device.

(2) The abnormality handling unit 58 may make the defense function provided in the apparatus indicated by the attack route information valid. The apparatus indicated by the attack route information is an apparatus located on the attack route (i.e., the route graph 62). In other words, the apparatus indicated by the attack route information can be said to be an apparatus related to the transfer of the packet causing the alert information. For example, the abnormality handling unit 58 may transmit a command to the GW-ECU 24 that processes the CAN frame (CAN-ID=0x100) indicated by the alert information to direct the GW-ECU 24 to filter the CAN frame (CAN-ID=0x100) (i.e., discard the frame without relaying it). Alternatively, the abnormality handling unit 58 may transmit a command to the GW-ECU 24 to direct the GW-ECU 24 to invalidate the CAN frame (CAN-ID=0x100) (e.g., transmit an error frame).

(3) The abnormality handling unit 58 may record a more detailed log related to the apparatus indicated by the attack route information than before the alert information is acknowledged. For example, the analysis ECU 26 may transmit the log generated in each apparatuses of the vehicle-mounted system 11 on a constant basis and transmit the log to the server 102. When the alert information is acknowledged, the abnormality handling unit 58 may transmit a command directing the apparatus on the attack route to generate a log more detailed than before and may transmit the log more detailed than before to the server 102. Meanwhile, the abnormality handling unit 58 may transmit a command to the apparatus outside the attack route to direct the apparatus to reduce the log volume as compared to before (i.e., generate a coarser log), thereby reducing the data volume of the log transmitted to the server.

It should be noted that the analysis ECU 26 may be configured to collect a detailed log from each apparatus of the vehicle-mounted system 11 on a constant basis, filter the content of the log (typically, maintaining only those contents that are relatively important), and transmit the filtered log to the server 102. When the alert information is acknowledged, the abnormality handling unit 58 may transmit, to the server 102, the log of the apparatus on the attack route that contains more detailed content than before. Meanwhile, the abnormality handling unit 58 may transmit, to the server 102, the log of the apparatus outside the attack route that is coarser than before (i.e., the log with a reduced data volume).

(4) The abnormality handling unit 58 may identify a type of attack in accordance with the apparatus, of the one or more apparatuses on the attack route indicated by the attack route information, that interfaces with an element external to the monitored system (i.e., the vehicle-mounted system 11). The abnormality handling unit 58 may store information indicating the identified type of attack in a predetermines storage. Further, the abnormality handling unit 58 may notify the server 102 of the alert information and the information indicating the type of attack. The apparatus that interfaces with an element external to the monitored system is an entrance apparatus through which the packet causing the alert information flows into the monitored system and will be referred to as "terminal end apparatus" here. In the case of the attack route information 60 shown in FIG. 7, the TCU 12 at the entrance of flow F1 may be identified as the terminal end apparatus.

In the case the terminal end apparatus is an apparatus such as the TCU 12 connected to a carrier network, the abnormality handling unit 58 may identify the type of attack as a remote attack. In the case the terminal end apparatus is an apparatus such as the IVI-ECU 16 connected to a near-field communication network like Wi-Fi (registered trademark) and Bluetooth (registered trademark), the abnormality handling unit 58 may identify the type of attack as a close-range attack. In the case the terminal end apparatus is an apparatus having an OBD (On-Board Diagnostics) port or a serial communication port, the abnormality handling unit 58 may identify the type of attack as a physical access attack.

Described above is an explanation based on an exemplary embodiment. Described above is an explanation based on an exemplary embodiment. It will be understood by those skilled in the art that various modifications to constituting elements and processes could be developed and that such modifications are also within the scope of the present disclosure.

A description will be given of the first variation. The analysis ECU 26 may further include an abnormality detection unit. Even when the alert information is not acknowledged, the analysis unit 54 generates route information that connects a plurality of flows stored in the flow information storage 44 in accordance with the conversion information stored in the conversion information storage 46. The route information includes the content (the route graph 62 and the attribute information 64) corresponding to the attack route information 60 shown in FIG. 7 and indicates the transfer route of the packet in the vehicle-mounted system 11.

The abnormality detection unit detects an abnormality in the vehicle-mounted system 11 in accordance with the route information generated by the analysis unit 54. Specifically, the abnormality detection unit stores one or both of a white list of route information (normal route information) and a blacklist (abnormal route information) that are predetermined. When the route information generated by the analysis unit 54 does not match the route information indicated by the white list or when the route information generated by the analysis unit 54 matches the route information indicated by the blacklist, the abnormality detection unit determines that the route in which the packet is transferred in the vehicle-mounted system 11 is abnormal.

When an abnormality in the packet transfer route is detected by the abnormality detection unit, the abnormality handling unit 58 may notify the server 102 of the fact that abnormality is detected and of the route information in which the abnormality is detected. According to this variation, unintended packet transfer in the vehicle-mounted system 11 or a vulnerable device can be detected even when the monitoring ECU 22 has not detected an abnormality. Thus, the security of the vehicle-mounted system 11 is further improved.

A description will be given of a second variation. The flow information may be stored in an apparatus external to the analysis ECU 26 (a further apparatus inside or outside the vehicle 10 and exemplified by the server 102). The analysis ECU 26 may store the ID of the flow processed by each apparatus of the vehicle-mounted system 11 and refer to the flow information stored in an external apparatus, using the ID as a key. Similarly, the conversion information may be stored in an apparatus external to the analysis ECU 26. The analysis ECU 26 may store the ID of the flow conversion executed by each apparatus of the vehicle-mounted system 11 and refer to the conversion information stored in the external apparatus, using the ID as a key. In other words, the analysis ECU 26 need not acquire flow information or flow conversion information directly but may be configured to acquire the information indirectly via the ID of the flow information or the ID of the flow conversion information to generate route information indirectly by associating the IDs with each other. In this case, the indirect route information may be converted into direct route information via the IDs. It should further be noted that a configuration in which an ID capable of identifying a combination "first flow—flow conversion information—second flow" may be assigned, and route information can be output based on the ID is covered by the technical scope of the present disclosure.

A description will be given of a third variation. The function(s) of one or both of the monitoring ECU 22 and the analysis ECU 26 may be provided in the central gateway (e.g., GW-ECU 24) in the vehicle-mounted system 11.

A description will now be given of a fourth variation. The process executed by the analysis ECU 26 in the embodiment may be executed in a cloud. For example, the server 102 may include the function of the analysis ECU 26 of the embodiment. Alternatively, the process executed by the analysis ECU 26 in the embodiment may be realized by a coordination of a plurality of devices. In other words, the technology described in the embodiment does not depend on the physical positions of the apparatuses and can be applied to an analysis system in which one or more devices provided at various positions including within the vehicle 10 or a cloud are coordinated.

Any combination of the embodiment and a variation will also be useful as an embodiment of the present disclosure. A new embodiment created by a combination will provide the combined advantages of the embodiment and the variation as combined. It will be understood by skilled person that the functions that should be achieved by the constituting elements recited in the claims are implemented either alone or in combination by the constituting elements shown in the embodiment and the variations.

The technology described in the embodiment and the variations may be defined by the following items.

[Item 1] An information processing apparatus including: an acquisition unit that directly or indirectly acquires information related to a first flow, information related to a second flow, and information related to a conversion that takes the first flow as input and the second flow as output, the first flow and the second flow organizing packets transferred in a monitored system into respective groups, an alert acknowledgment unit that acknowledges alert information generated in the monitored system and including information capable of identifying at least one flow; and a generation unit that generates, when the second flow is identified by the alert information, route information that includes at least one of the information related to the conversion and the information related to the first flow associated with the second flow in the information related to the conversion.

This information processing apparatus supports identification of a route related to the occurrence of an abnormality in a monitored system and proper handling of an abnormality or an attack in accordance with the route.

[Item 2] The information processing apparatus according to item 1, wherein at least one of the information related to the first flow and the information related to the second flow includes information related to a source and a destination of a CAN (Controller Area Network) frame.

According to this information processing apparatus, it is possible to identify a route related to the occurrence of an abnormality in a monitored system that includes a CAN.

[Item 3] The information processing apparatus according to item 1 or item 2, further including: an abnormality handling unit that executes a process for handling an abnormality in accordance with the route information generated by the generation unit.

According to this information processing apparatus, an abnormality or an attack can be handled properly in accordance with the route related to the occurrence of an abnormality in a monitored system.

[Item 4]
The information processing apparatus according to item 3, wherein the route information includes information indicating one or more apparatuses related to transfer of a packet causing generation of the alert information, and the process for handling an abnormality is a process to make a defense function provided in an apparatus indicated by the route information valid.

According to this information processing apparatus, the safety of a monitored system is further enhanced by making valid the defense function of the apparatus on the attack route, i.e., the apparatus that could possibly be vulnerable.

[Item 5]
The information processing apparatus according to item 3, wherein the route information includes information indicating one or more apparatuses related to transfer of a packet causing generation of the alert information, and the process for handling an abnormality is a process to record a more detailed log related to an apparatus indicated by the route information than before the alert information is acknowledged.

This information processing apparatus supports analysis of an attack and supports proper handling, by recording a detailed log related to the apparatus on the attack route, i.e., the apparatus that could possibly be vulnerable.

[Item 6]
The information processing apparatus according to item 3, wherein the route information includes information indicating one or more apparatuses related to transfer of a packet causing generation of the alert information, and the process for handling an abnormality is a process to identify a type of attack in accordance with an apparatus, of the one or more apparatuses, that interfaces with an element external to the monitored system.

This information processing apparatus supports analysis of an attack and supports proper handling, by identifying a type of attack.

[Item 7]
An information processing system including: the information processing apparatus according to one of items 1 through 6; a first storage that stores the information related to the first flow and the information related to the second flow; and a second storage that stores the information related to the conversion.

This information processing system supports identification of a route related to the occurrence of an abnormality in a monitored system and proper handling of an abnormality or an attack in accordance with the route.

[Item 8]
The information processing system according to item 7, further including: an abnormality detection unit, wherein the first storage stores information related to a plurality of flows collected from apparatuses forming the monitored system, the second storage stores information related to a plurality of conversions collected from apparatuses forming the monitored system, the generation unit generates route information that connects a plurality of flows in accordance with input and outputs indicated by the information related to the conversion stored in the second storage, even when the alert information is not acknowledged, and the abnormality detection unit detects an abnormality in the monitored system in accordance with the route information generated by the generation unit.

According to this information processing system, unintended packet transfer in a monitored system or a vulnerable device can be detected even when an abnormality has not been detected in the monitored system. Thereby, the security of the monitored system is further improved.

[Item 9] An information processing method implemented by a computer, including: directly or indirectly acquiring information related to a first flow and information related to a second flow, the first flow and the second flow organizing packets transferred in a monitored system into respective groups, and information related to a conversion that takes the first flow as input and the second flow as output; acknowledging alert information generated in the monitored system and including information capable of identifying at least one flow; and generating, when the second flow is identified by the alert information, route information that includes at least one of the information related to the conversion and the information related to the first flow associated with the second flow in the information related to the conversion.

This information processing method supports identification of a route related to the occurrence of an abnormality in a monitored system and proper handling of an abnormality or an attack in accordance with the route.

[Item 10]
A computer program including computer-implemented modules including: a module that directly or indirectly acquires information related to a first flow and information related to a second flow, the first flow and the second flow organizing packets transferred in a monitored system into respective groups, and information related to a conversion that takes the first flow as input and the second flow as output; a module that acknowledges alert information generated in the monitored system and including information capable of identifying at least one flow; and a module that generates, when the second flow is identified by the alert information, route information that includes at least one of the information related to the conversion and the information related to the first flow associated with the second flow in the information related to the conversion.

This computer program supports identification of a route related to the occurrence of an abnormality in a monitored system and proper handling of an abnormality or an attack in accordance with the route.

What is claimed is:

1. An information processing apparatus comprising:
    an acquisition unit that directly or indirectly acquires information related to a first flow, information related to a second flow, and information related to a conversion that takes the first flow as input and the second flow as output, the first flow and the second flow organizing packets transferred in a monitored system into respective groups,
    an alert acknowledgment unit that acknowledges alert information generated in the monitored system and including information capable of identifying at least one flow; and
    a generation unit that generates, when the second flow is identified by the alert information, route information that includes at least one of the information related to the conversion and the information related to the first flow associated with the second flow in the information related to the conversion.

2. The information processing apparatus according to claim 1, wherein
    at least one of the information related to the first flow and the information related to the second flow includes information related to a source and a destination of a CAN (Controller Area Network) frame.

3. The information processing apparatus according to claim 1, further comprising:
    an abnormality handling unit that executes a process for handling an abnormality in accordance with the route information generated by the generation unit.

4. The information processing apparatus according to claim 3, wherein
    the route information includes information indicating one or more apparatuses related to transfer of a packet causing generation of the alert information, and
    the process for handling an abnormality is a process to make a defense function provided in an apparatus indicated by the route information valid.

5. The information processing apparatus according to claim 3, wherein
    the route information includes information indicating one or more apparatuses related to transfer of a packet causing generation of the alert information, and
    the process for handling an abnormality is a process to record a more detailed log related to an apparatus indicated by the route information than before the alert information is acknowledged.

6. The information processing apparatus according to claim 3, wherein
    the route information includes information indicating one or more apparatuses related to transfer of a packet causing generation of the alert information, and
    the process for handling an abnormality is a process to identify a type of attack in accordance with an apparatus, of the one or more apparatuses, that interfaces with an element external to the monitored system.

7. An information processing system comprising:
    the information processing apparatus according to claim 1;
    a first storage that stores the information related to the first flow and the information related to the second flow; and
    a second storage that stores the information related to the conversion.

8. The information processing system according to claim 7, further comprising:
    an abnormality detection unit, wherein
    the first storage stores information related to a plurality of flows collected from apparatuses forming the monitored system,
    the second storage stores information related to a plurality of conversions collected from apparatuses forming the monitored system,
    the generation unit generates route information that connects a plurality of flows in accordance with input and outputs indicated by the information related to the conversion stored in the second storage, even when the alert information is not acknowledged, and
    the abnormality detection unit detects an abnormality in the monitored system in accordance with the route information generated by the generation unit.

* * * * *